(12) United States Patent
Wang et al.

(10) Patent No.: US 6,734,409 B1
(45) Date of Patent: May 11, 2004

(54) MICROWAVE ASSISTED BONDING METHOD AND JOINT

(75) Inventors: Liusheng Wang, Irvine, CA (US); Scott Hellman, Aliso Viejo, CA (US); Paul Townley-Smith, Irvine, CA (US); Michael Ushinsky, Irvine, CA (US)

(73) Assignee: Corning Incorporated, Corning, NY (US)

( * ) Notice: Subject to any disclaimer, the term of this patent is extended or adjusted under 35 U.S.C. 154(b) by 51 days.

(21) Appl. No.: 10/284,941

(22) Filed: Oct. 31, 2002

(51) Int. Cl.[7] ............................................... H05B 6/64
(52) U.S. Cl. ..................... 219/759; 219/678; 219/680
(58) Field of Search .............................. 219/678, 680, 219/685, 756, 759, 679, 728, 730; 156/272.2, 272.4; 428/35.8; 426/107, 113, 234, 243; 285/187, 423; 422/21, 109

(56) References Cited

U.S. PATENT DOCUMENTS

| | | | |
|---|---|---|---|
| 3,620,875 A | | 11/1971 | Guglielmo et al. |
| 4,626,642 A | | 12/1986 | Wang et al. |
| 5,217,768 A | * | 6/1993 | Walters et al. ............. 428/35.8 |
| 5,254,824 A | * | 10/1993 | Chamberlain et al. ...... 219/759 |
| 5,338,611 A | | 8/1994 | Lause et al. |
| 5,391,430 A | * | 2/1995 | Fabish et al. ............... 219/728 |
| 5,439,528 A | | 8/1995 | Miller |
| 5,603,795 A | * | 2/1997 | Paulauskas et al. ...... 156/272.2 |
| 5,804,801 A | | 9/1998 | Lauf et al. |
| 5,858,303 A | * | 1/1999 | Schiffmann et al. ........ 219/759 |
| 5,879,756 A | | 3/1999 | Fathi et al. |
| 6,103,812 A | | 8/2000 | Wei et al. |
| 6,312,548 B1 | | 11/2001 | Fathi et al. |
| 6,343,166 B1 | | 1/2002 | Hellman et al. |
| 6,344,272 B1 | | 2/2002 | Oldenburg et al. |
| 6,348,679 B1 | | 2/2002 | Ryan et al. |
| 6,350,792 B1 | | 2/2002 | Smetana et al. |
| 6,368,994 B1 | | 4/2002 | Sklyarevich |
| 2002/0024170 A1 | | 2/2002 | Takeshima et al. |

OTHER PUBLICATIONS

Budraa, N, Batmatz M., Mai, J., Pike, T. and Jackson, H., "Hermetic Wafer Bonding by Use of Microwave Heating", for NASA's Jet Propulsion Laboratory, Pasadena, California, 2 pages, May 2001.

* cited by examiner

Primary Examiner—Tu Ba Hoang
(74) Attorney, Agent, or Firm—Mary Y. Redman (57) ABSTRACT

A method of bonding together first and second components and a joint are provided. The method includes the steps of applying a film coating of electrically conductive material to an adjoining interface of a first component surface of the first component and a second component surface of the second component. The film coating has a thickness of less than 200 nanometers. The method also includes the step of positioning the first and second components such that the film coating is disposed between the first and second component surfaces. The method further includes the step of irradiating microwave energy to the film coating to generate thermal energy on the film coating to bond together the first and second components.

40 Claims, 4 Drawing Sheets

MICROWAVE ASSISTED BONDING METHOD AND JOINT

BACKGROUND OF THE INVENTION

1. Field of the Invention

The present invention generally relates to the bonding together of components and, more particularly, relates to a microwave assisted joining technique for bonding together components, such as electronic and fiber optic components.

2. Technical Background

The packaging of many electronic and fiber optic (e.g., photonic) devices generally requires the joining together of components by employing adhesive bonding, soldering, or diffusion bonding/welding techniques. Many conventional bonding techniques employed for such packaging generally experience drawbacks. For example, in-situ precision alignment and adhesive bonding of photonic components may exhibit thermally induced repositioning due to ultraviolet (UV) light or heat-assisted curing. Some electronic and photonic components employ brittle glass that can be easily damaged due to thermal generally require an adhesive layer be directly and completely exposed to the ultraviolet light. Due to various shapes of components and the metal units that typically hold these components, problems of shadowing can prevent the ultraviolet light from reaching some portions of the adhesive layer, thereby increasing unwanted repositioning as well as the time required to cure the adhesive.

Bonding techniques utilizing induction-heating have been employed in which heat is produced via eddy currents generated by magnetically induced currents. The application of induction-heating to the adhesive can reduce the cure time required. However, in conventional induction-heat assisted bonding techniques, heat is typically generated by heating elements in ovens and delivered through radiation, convection, or conduction to the adhesive or solder interface. Thus, the delivery of thermal energy (heat) is an outside-to-inside heat transfer process that generally experiences high thermal energy losses.

It is also known to utilize microwave energy to weld thermoplastic substrates together or to cure a thermal setting adhesive to accelerate the rate of cure. Examples of known microwave assisted bonding techniques are disclosed in U.S. Pat. Nos. 5,338,611, 4,626,642, 5,879,756, and 6,312,548, the entire disclosures of which are hereby incorporated herein by reference. Although some polymer adhesives well absorb the microwave radiation and, therefore, can be heated in microwave assisted bonding, the bonding of components is often facilitated by a conductive pattern, which generates heat upon being irradiated with microwave energy. The electrically conductive pattern generally is positioned on a joining surface of two components and a heat curable adhesive is typically applied thereto, so the components are bonded together along the conductive pattern.

While the above-described conventional microwave assisted bonding techniques are capable of generating heat in a region near the adhesives, the conventional approaches generally cannot be applied to thin bond layers (e.g., layers less than ten microns) commonly used in micro-optic packaging. Additionally, conventional prefabricated conductive patterns, which may include perforated metal or carbon film, are generally thick, and therefore may reflect a large portion of the microwave energy. In such situations, the absorption of the microwave energy for heat generation may be inefficient. The prefabricated conductive pattern conducts heat to the adherent components and also magnifies the thermal excursion of the assembly, thereby lowering the precision optical alignment. The prefabrication of some conductive patterns generally increases the process complexity and the assembly cost. Further, conventional conductive patterns may not be effectively used to bond sub-microcomponents having thermal masses similar to that of the conductive pattern.

The relatively thick prefabricated conductive patterns generally are not optically transparent. As a consequence, the conventional conductive patterns block light and, thus, cannot be utilized for joining optical components which require light transmission therethrough. This becomes a problem when the prefabricated pattern is required to cover the joining interface almost completely to equalize the thermal field.

Accordingly, it is therefore desirable to provide for a method of bonding together first and second components that is optically precise and heat efficient and can be used in electronic, fiber optic, and photonic packaging. It is further desirable to provide for such a cost-effective method of bonding together components to perform adhesive bonding, soldering, and/or diffusion bonding, by efficiently depositing the microwave energy so as to effectively generate heat at the bonding interface.

SUMMARY OF THE INVENTION

In accordance with the teachings of the present invention, a method of bonding together first and second components and a resultant joint are provided. The method includes the steps of applying a film coating of electrically conductive material to an adjoining interface of a first component surface of the first component and a second component surface of the second component. The film coating has a thickness of less than 200 nanometers. The method also includes the step of positioning the first and second components such that the film coating is disposed between the first and second component surfaces. The method further includes the step of irradiating a microwave energy field to the film coating to generate thermal energy on the film coating to bond together the first and second components.

According to another aspect of the present invention, a joint interconnecting first and second components is provided. The joint includes a first component having a first component surface and a second component having a second component surface. The joint further includes a film coating of electrically conductive material disposed at an adjoining interface between the first and second component surfaces of the first and second components. The film coating has a thickness of less than 200 nanometers. The joint is formed by irradiating a microwave energy field to the film coating such that the film coating generates thermal energy to bond together the first and second component surfaces to form the joint.

Accordingly, the joint and method of bonding first and second components according to the present invention advantageously provides for precise and thermally efficient bonding together of components. The bonding method is cost-effective and may be used to provide adhesive bonding, soldering, or diffusion bonding, all of which are particularly useful for bonding small (e.g., micro) components together in electronic, fiber optic, and photonic packaging.

Additional features and advantages of the invention will be set forth in the detailed description which follows and will be apparent to those skilled in the art from the description or recognized by practicing the invention as described in the description which follows together with the claims and appended drawings.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description serve to explain the principals and operation of the invention.

DETAILED DESCRIPTION OF THE PREFERRED EMBODIMENTS

Figure 1:
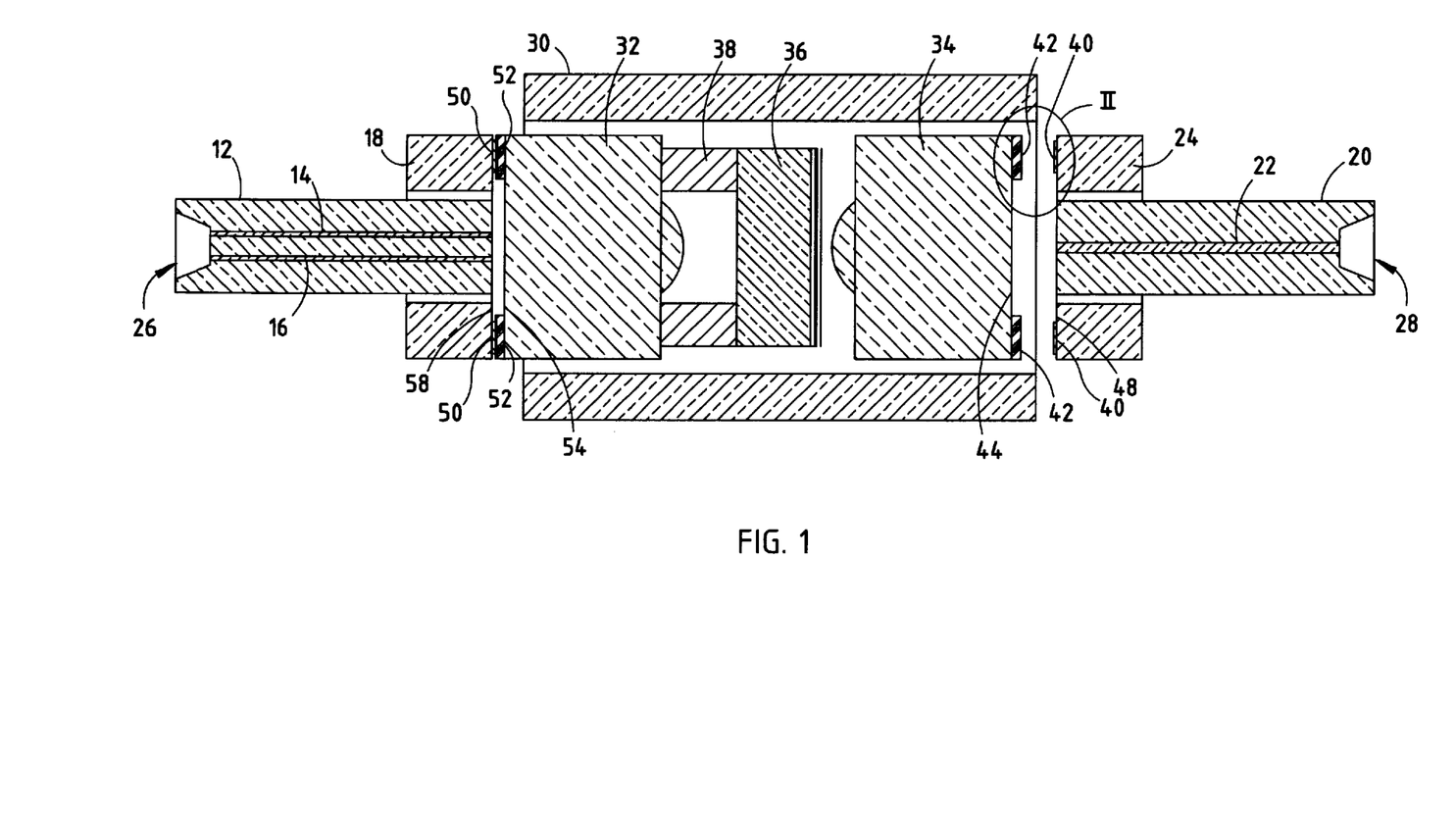
FIG. 1 is a cross-sectional view of a three-port filtering glass package illustrating adhesive bonding together of components according to one embodiment.

The present invention provides for a method of bonding components together with the use of microwave energy. The microwave assisted bonding method of the present invention is particularly advantageous for bonding together electronic components and fiber optic components, including photonic components such as filters and lenses. The microwave bonding method is described herein by way of example for the bonding together of individual components of a three-port filtering glass micro-optic package 10 as shown in FIG. 1. However, the microwave bonding method of the present invention may be used to bond together various components, and is not intended to be limited to a three-port filtering glass micro-optic package 10.

Referring to FIG. 1, the three-port filtering glass micro-optic package 10 is generally shown having a dual-fiber ferrule 12 with first and second optical fibers 14 and 16 extending from an input port 26, and a single-fiber ferrule 20 having a third optical fiber 22 extending to an output port 28. The dual-fiber ferrule 12 and single-fiber ferrule 20 are supported on the outside by end tubes 18 and 24, respectively. The end tubes 18 and 24 are bonded to a lens and filter assembly which includes optical lenses 32 and 34, and a filter 36. The filter 36 is supported between lenses 32 and 34 by a filter holder 38. The lenses 32 and 34 and filter 38 are further supported on the outside by a central tube 30.

The end tube 24 is a first component having a surface 58 bonded to a surface 54 of lens 32 which is a second component. Likewise, end tube 24 is a third component having a surface 48 bonded to a surface 44 of lens 34 which is a fourth component. The bond formed between first and second components 24 and 34, as well as between third and fourth components 18 and 32, are achieved with a microwave assisted bonding technique (method) according to the present invention.

Figure 2:
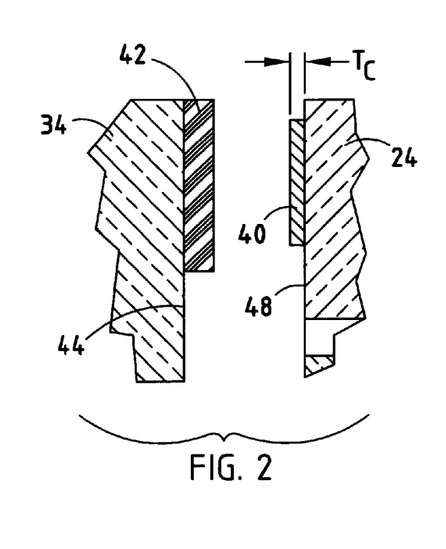
FIG. 2 is an enlarged sectional view of section II of FIG. 1 further illustrating the adhesive bonding.

To further illustrate the bonding technique shown in FIG. 1, one of the resultant joints formed by the bonding technique is illustrated in greater detail in FIG. 2, according to an adhesive bonding embodiment. The component surface 44 of second component 34 is adhered to component surface 48 of first component 24 via a thermally curable adhesive 42. One example of a thermally curable adhesive includes biphenolic epoxy with a thermal cure initiator, such as 353 ND epoxy commercially available from Epoxy Technology Inc. (EpoTek). The adhesive 42 may also include microwave susceptive filling enhancers, such as micro- and nano-fibers, and pigments to provide further accelerated, localized, and efficient thermal cure of the adhesive 42.

Applied to an adjoining interface of the component surfaces 44 and 48 is a thin film coating of electrically conductive material 40 which may be in the form of a clustered nano-film. The thin film coating of electrically conductive material 40 is disposed in close proximity to the thermally curable adhesive 42 and operates as a microwave susceptor to generate thermal energy (heat) when irradiated with a microwave energy field. The heat generated on the thin film coating of electrically conductive material 40 provides thermal energy that is applied to the adhesive 42 so as to cure the adhesive, and thus the bond between components 34 and 24. While a single thin film coating of electrically conductive material 40 is shown disposed on surface 48 of component 24, it should be appreciated that the thin film coating 40 may otherwise be disposed on component surface 44 of component 34. It should further be appreciated that while a single film coating 40 of electrically conductive material is shown and described herein, a plurality of thin film coatings may be disposed in close proximity to the bonding interface to generate heat when irradiated-with a microwave energy field so as to provide thermal curing of an adhesive material.

The clustered nano-films forming the thin film coating 40 have ballistic type electric resistivity and generate significant Joule heat that is localized at the component interface between the adjoining components 24 and 34 as shown in FIG. 2. A liquid heat curable adhesive 42 predispensed between the coated components 24 and 34 can, therefore, be properly cured with the applied thermal energy. With this process, the cure cycle is extremely short, the temperature rate is very high, and the heat transfer mode is almost transitional (unsteady). Thus, only the adhesive layer 42 and thin interfacial zones of the components 24 and 34 are substantially exposed to a highly localized temperature field ("thermal inclusion"), while the rest of the assembly retains its relatively low temperature and, therefore, the assembly can maintain its precision alignment.

Figure 3:
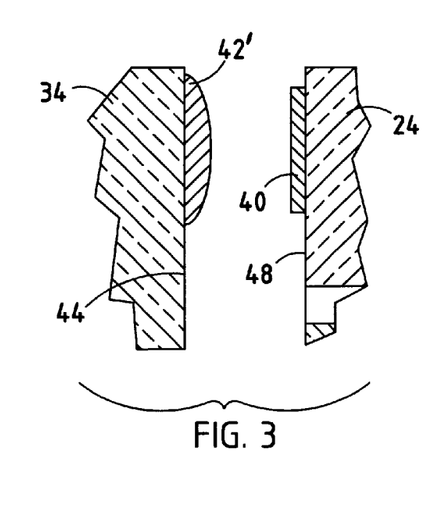
FIG. 3 is a sectional view illustrating solder bonding for bonding components together according to another embodiment.

Referring to FIG. 3, the microwave assisted bonding of components 34 and 24 is shown using solder bonding according to a second embodiment of the present invention. The solder bonding embodiment employs one or more solder alloy (metal) films 42' that form a low-temperature soldering eutectic when thermally heated to a temperature sufficient to melt the solder 42'. The solder layer 42' may be comprised of two different coating materials to form the soldering alloy. The solder layer 42' may include a composition of 63% Sn and 37% Pb, according to one example. The thin film coating of electrically conductive material 40 is disposed between the first and second component surfaces 44 and 48 and in close proximity to the solder layer 42' so as to generate heat when irradiated with a microwave energy field. The heat generated at the thin film coating of electrically conductive material 40 is applied to the eutectic solder layer 42' so that the solder melts and its subsequent hetero-diffusion into the adherent material forms a hermetic solder joint. Additionally, a low level pressure may be applied to force component surfaces 44 and 48 together when forming the solder joint (pool). While a single thin layer coating of electrically conductive material 40 is shown in the solder bonding embodiment, it should be appreciated that a plurality of thin conductive coatings 40 may be employed to heat the solder layer 42' and form the resultant solder joint.

Figure 4:
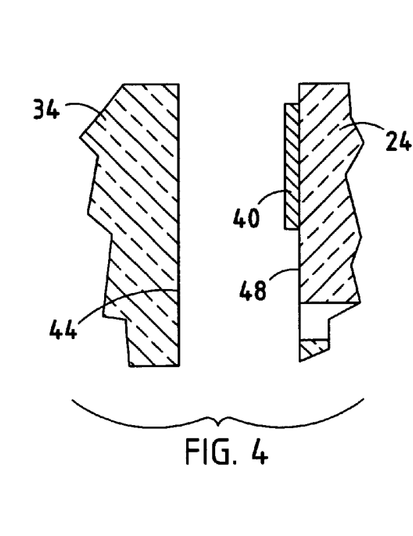
FIG. 4 is a sectional view illustrating diffusion/weld bonding for bonding components together according to a further embodiment.

Referring to FIG. 4, a diffusion bond (i.e., weld) is illustrated according to a third embodiment of the present invention. The diffusion bonding technique employs the thin film coating of electrically conductive material 40 disposed between component surfaces 44 and 48 of first and second components 24 and 34, respectively. The thin film coating of electrically conductive material 40 serves as a heat susceptor that generates heat at the bonding interface of component surfaces 44 and 48 to a temperature that exceeds the recrystalization temperature of the material of component surfaces 44 and 48. According to one embodiment, the temperature generated by the thin film coating of electrically conductive material 40 exceeds the recrystalization temperature of a component material and approaches 80% of the solidus temperature of the material. At the same time, the component surfaces 44 and 48 may be subjected to a compression load to force (stress) the surfaces 44 and 48 together. According to this diffusion bonding/welding embodiment, the thin film coating of electrically conductive material 40 may include material that regulates the activation energy and stimulates the hetero-diffusion. One example of such material may include Ni—Cu (having substantially unlimited hetero-diffusion) or similar metal or combinations of materials. The first and second components 24 and 34 may include any of a number of materials including fused silica glass substrates, polymeric materials, metals, and other materials which are capable of forming a bond between adjacent surfaces when heated to at least the recrystalization temperature.

In each of the embodiments discussed above, microwave energy is irradiated on the adjoining interface and applied to the thin film coating of electrically conductive material 40 so as to generate heat at a location where a joint is to be formed to bond first and second components together. The thin film coating of electrically conductive material 40 has a thickness $T_c$ of less than 200 nanometers. According to a more specific embodiment, the thin film coating 40 has a thickness $T_c$ in the range of 10 to 110 nanometers. With this range, the thickness of nano-coating exceeds the mean free path of photons (about 10 nanometers) and does not exceed the mean free path of major heat carries, electrons and phonons (about 100 nanometers). According to yet a more specific embodiment, the film coating 40 has a thickness $T_c$ in the range of approximately 25 to 75 nanometers. This range reflects the majority of the alloys that can be used in the thin film coating 40 as the effective nano-heaters. According to yet a more specific embodiment, the film coating 40 has a thickness Tc in the range of about 31 to 34 nanometers. This range reflects the experimentally obtained optimum heating efficiency. The thin film coating 40 is positioned within a distance of 500 microns from the adjoining interface so as to efficiently transfer heat generated therein to the adjoining interface for bonding of the two component surfaces 44 and 48.

The thin film coating 40 is made of an electrically conductive material having a high electrical resistivity and is thermally conductive. According to one embodiment, the thin film coating of conductive material 40 is comprised of a ferro nickel based metal alloy. The thin film coating of electrically conductive material 40 is electrically energized by microwave energy irradiated thereon so as to generate thermal energy (heat) to be applied to the bonding interface. According to one example, the optically transparent thin film coating 40 may have a Hastelloy-like composition including 42% Ni, 37% Cr, 15% Fe, and 6% Mn (similar to that of common neutral density (ND) filters). These films are very efficient microwave susceptors capable of generating a high level of thermal energy (heat) in a short amount of time. According to this example, the optically transparent film coating 40 may have an optical density in the range of 0.1 to 0.9. Another example of an efficient microwave susceptor for use as the thin film coating of electrically conductive material 40 may have the composition of 72.6% Ni, 16% Cr, and 9.5% Fe, which is an Incoloy-like lattice system.

The heat rate achieved by irradiating the microwave energy field onto the thin film coating of electrically conductive material 40 depends on a number of factors including the film thickness, lattice structure, pattern of the thin film coating 40 and the thermal mass of the adjoining component substrates, as well as the thickness of any adhesive or solder material. The pattern of the thin film coating 40 may be configured in any of a number of shapes including a rectangle, a plurality of rectangles, a rectangle combined with one or more openings, as well as other shapes, such that the sharp textures increase the parameters of plasmonic resonance in the lattice clusters.

Figure 5:
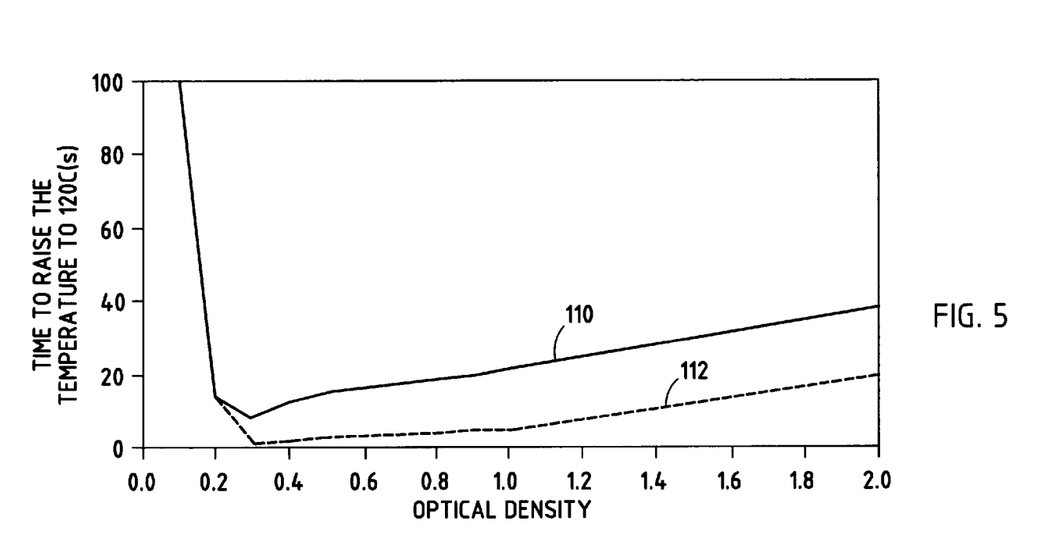
FIG. 5 is a graph illustrating experimentally established microwave heating rates in Hastelloy and Incoloy coated glass substrates having different coating thicknesses.

Experimental results for microwave heating rates are shown in FIG. 5 for a Hastelloy coated glass substrate illustrated by the solid line 110 and for an Incoloy glass substrate illustrated by the dashed line 120 for different coating thicknesses (optical densities) as the time elapsed to raise the temperature from 20° C. to 120° C. The most efficient heating was observed in a sample with an optimum 0.3 optical density (OD) corresponding to about 33 to 34 nanometers thick coating. The surface temperature was raised from 20° C. to 120° C. in about three seconds. In the case of very thin coatings, say 0.1 OD, the efficiency of heat generation was more than twelve to thirty times lower than that of the above optimized substrate having 0.3 OD. These extremely thin nano-coatings are substantially photon-transparent and have extremely small microwave absorbance, despite of their nano-film coating. For the sample with a relatively thick coating (e.g., 2.00 OD), the electrical resistivity becomes low (as in bulk material). This, in turn, decreases the heat generation efficiency by almost three to four times. Further increase in the coating thickness involves the mechanisms of the mixed ballistic-diffusive conductivity and, therefore, reduces the heat rate. When the coating thickness exceeds the mean free path of electrons (about 100 nanometers), the practically diffusive conductivity substantially reduces the heat generation efficiency. When the coating thickness approaches the micron level (e.g., 1000 nanometers), arcing may occur in a single frequency microwave field. Arcing should be avoided when bonding precision optical components.

With the temperature change from 20° C. to 120° C. and an estimated thermal resistance of the coated sample of 0.58 Kelvin/watts (k/w), the through-thickness heat flux was as high as 172.5 watts. Although we were unable to monitor directly the electric currents in nano-films due to the plasmonic resonance, the generated heat flux was very high. A simple estimate involving Joule law indicates that the overall electrical resistivity of the nano-film was almost $10^3$ times higher than that of the bulk Hastelloy and Incoloy (1.35 $\mu\Omega$m and 1.02 $\mu\Omega$m) analogs.

It should be appreciated that the thin layer coating 40 of conductive material may be applied at the bonding interface according to any of a number of known techniques. According to one technique, the thin layer conductive coating 40 may be applied by depositing a metal having a nano-coating $T_c$ of less than 200 nanometers by using electric discharge or cathodic sputtering (cathodic arc). Alternately, plasma deposition, ion assistant deposition and ion beam sputtering deposition may be employed. Before the deposition, the substrate to which the conductive layer 40 is applied should be cleaned to be substantially free of dust, oils, and other particulate or film deposits by use of a chemical cleaning solvent, such as acetone and alcohol or other degreasers, as are generally well-known. The cathodic arc technique uses a pulsed plasma arc source that can produce a high energy flux of metal plasma, which is generated by a vacuum arc discharge. During the arc discharge, the solid cathode surface is vaporized and ionized. The vacuum arc source produces intense fluxes of highly ionized metal plasma which, when condensed, forms the thin conductive layer 40 When deposited on the oxide-type glasses and ceramics, these coatings typically form the clustered lattice nano-systems. When a patterned nano-coating of conductive layer 40 is desired, the coating is deposited on the substrate and then patterned using a strong chemical etchant, or masking may be employed for fine pattern textures interfacing the adhesive layer in microassemblies.

By virtue of electromagnetic plasmonic resonance and skin effect, most of the deposition of the electromagnetic energy of the microwave energy field occurs within the thin conductive nano-coating of the electrically conductive material 40. Oscillations of electric charge in the surface of the thin film coating 40 can be selectively excited by irradiating the microwave energy field thereon. A resonant condition between the microwave energy field and the charge oscillation (called the surface plasmons) causes the surface plasmon resonance at the thin film coating interface. The resonance parameters depend on the dielectric constant (loss tangent) of both the thin film coating of electrically conductive material 40 and the surrounding substrate materials and the coating thickness. This resonance can be dominated by absorption or scattering depending on the dimensions of nano-particles (clusters) with respect to the wavelength of the incident electromagnetic radiation. The resonance causes a strong local-field enhancement in the interior of the metal nano-particles. With particulate laminate metal nano-coatings, the bandwidth of the surface plasmon resonance can cover a wide spectrum of microwave energy frequencies, which allows for use of different microwave resonators.

The microwave energy may include a microwave field having a frequency in the range of about 300 megahertz to 100 gigahertz. The microwave energy source may have a multi- or single-mode cavity and may irradiate variable frequency microwave energy or fixed frequency microwave energy in order to deposit the energy primarily into the adjoining interface region at the thin film coating of electrically conductive material 40. The microwave energy field, according to one example, may be transmitted at a power in the range of about 50 watts to 1,000 watts.

Figure 6:
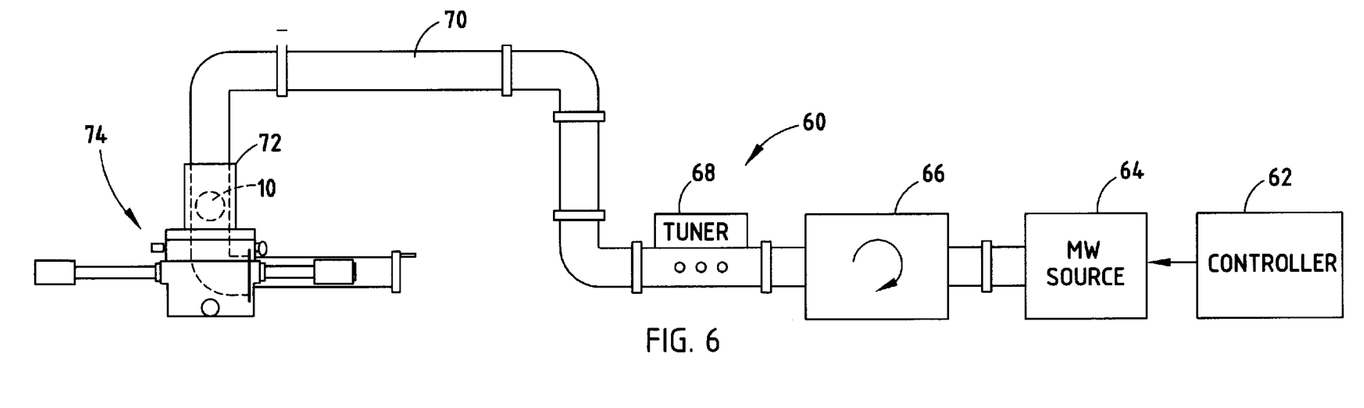
FIG. 6 is a schematic diagram illustrating an in-line microwave bonding system for use in the microwave assisted bonding.

Referring to FIG. 6, an in-line microwave bonding system 60 is generally illustrated for use in the microwave assisted bonding of first and second components, according to one embodiment. The in-line microwave bonding system 60 employs a controller 62, such as a microprocessor-based system, for controlling a microwave (MW) energy source 64 which, in turn, generates a microwave energy field (300 megahertz to 100 gigahertz) at a variable or fixed frequency. The microwave energy field generated by microwave source 64 is transmitted to a circulator 66 which prevents the reverse power from entering the microwave source 64. The microwave bonding system 60 further includes a tuner 68 which is shown as a three-stub tuner (copper rods) device that perturbate the magnetic field in a waveguide. A waveguide 70 is provided at the output of the tuner 68 to provide a mini-chamber for the microwave assisted bonding of components. A precision alignment system 74 aligns the to-be-bonded components and holds them inside of an applicator 72.

Figures 7, 8:
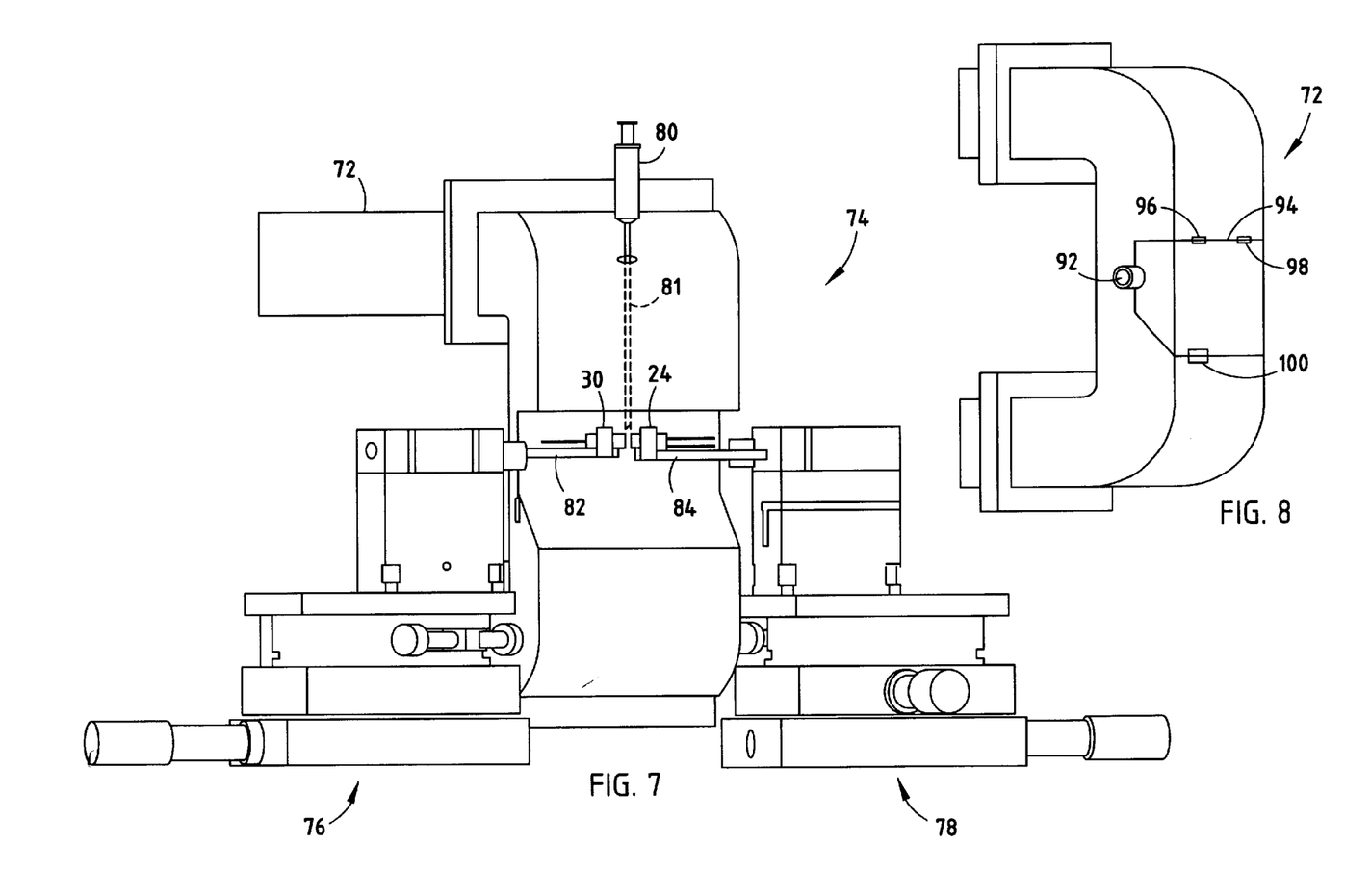
FIG. 7 is an alignment system of the in-line microwave bonding system shown in FIG. 6.
FIG. 8 is a detailed view of the single frequency microwave applicator of the in-line microwave bonding system shown in FIG. 6.

The alignment system 74 is further illustrated in FIG. 7 having two precision motion stages 76 and 78 having piezoelectric transducers. In the case of the fixed frequency microwave bonding applicator 72, the alignment system 74 shown in FIG. 7 is positioned outside the applicator chamber 72. In the case of the variable frequency system, the alignment system 74 may be positioned also inside the applicator chamber 72. The pre-aligned components 30 and 24 are mounted and fixed onto the precision motion stages using ceramic or quartz holders 82 and 84, respectively. The microwave transparent ceramic or quartz holders 82 and 84 minimize the perturbation of microwave energy inside the applicator 72, therefore preventing arching or significant heating of the holders 82 and 84. An adhesive dispensing system 80 shown in FIG. 7 delivers the adhesive into the adjoining interface of the components 30 and 24 via its microwave transparent needle 81.

The single (or fixed) frequency microwave applicator 72, which is further shown in FIG. 8, includes a movable section 94 (e.g., door) of a waveguide, which, when open, allows the manipulation of optical components inside of the applicator 72. The door 94 is attached via hinges 96 and 98 so pivoting the door 94 for its open and closed positions. The applicator 72 also includes two chokes 92 through which the to-be-bonded components and holders can be fed into the chamber. The chokes 92 also attenuate the microwave power, thereby ensuring a minimal leakage of the microwave energy. Further, the applicator 72 includes a safety interlock sensor 100 for detecting open and closed positions of the door 94. The safety interlock 100 acts as a shut off device to turn off the microwave energy source when the door 94 is detected to be open.

While one example of an in-line microwave bonding system 60 is shown and described herein having an alignment system 74 and an applicator 72, it should be appreciated that the bonding method and joint of the present invention may be achieved with various microwave assisted bonding systems without departing from the teachings of the present invention.

Accordingly, the microwave assisted bonding method and joint of the present invention advantageously provides for precise and thermally efficient bonding of first and second components. The bonding method is cost-effective and may be used to provide adhesive bonding, solder bonding, and a diffusion/weld bonding, all of which are useful for bonding microcomponents together in electronics, fiber optic, and photonic packaging. It should be appreciated that the microwave assisted bonding approach may be employed to bond first and second components together having various types of materials.

It will become apparent to those skilled in the art that various modifications to the preferred embodiment of the invention as described herein can be made without departing from the spirit or scope of the invention as defined by the appended claims.

The invention claimed is:

1. A method of bonding together first and second components, comprising the steps of:
applying a film coating of electrically conductive material to an adjoining interface of a first component surface of the first component and a second component surface of the second component, wherein the film coating has a thickness of less than 200 nanometers;
positioning the first and second components such that the film coating is disposed between the first and second component surfaces; and
irradiating a microwave energy field to the film coating to generate thermal energy on the film coating to bond together the first and second components.

2. The method as defined in claim 1, wherein the film coating is positioned within a distance of 500 microns from the adjoining interface.

3. The method as defined in claim 1, wherein the film coating has a thickness in the range of 10 to 110 nanometers.

4. The method as defined in claim 3, wherein the film coating has a thickness in the range of approximately 25 to 75 nanometers.

5. The method as defined in claim 1, wherein the film coating comprises a ferro nickel based metal alloy.

6. The method as defined in claim 1, wherein the film coating is optically transparent having an optical density in the range of 0.1 to 0.9.

7. The method as defined in claim 1, wherein the microwave energy field source has a frequency in the range of about 300 megahertz to 100 gigahertz.

8. The method as defined in claim 1, wherein the microwave energy field is transmitted at a power in the range of about 50 watts to 1000 watts.

9. The method as defined in claim 1, wherein the first and second components are substantially transparent to the microwave energy field.

10. The method as defined in claim 1, wherein the first and second components comprise optical components.

11. The method as defined in claim 1 further comprising the step of applying an adhesive material between the first and second component surfaces, wherein the thermal energy generated in the film coating cures the adhesive material.

12. The method as defined in claim 1 further comprising the step of applying a solder material between the first and second component surfaces, wherein the thermal energy generated in the film coating forms a solder joint.

13. The method as defined in claim 12, wherein the coating material is a soldering alloy.

14. The method as defined in claim 13, wherein two different coating materials are deposited on the adjoining interface to form a low temperature eutectic soldering alloy.

15. The method as defined in claim 1, wherein the thermal energy generated in the film coating forms a weld at the interface of the first and second component surfaces.

16. A method of bonding together first and second optical components that are substantially transparent to a microwave energy field, said method comprising the steps of:
applying a film coating of electrically conductive material to an adjoining interface of a first component surface of the first optical component and a second component surface of the second optical component, wherein the film coating has a thickness of less than 200 nanometers;
positioning the first and second optical components such that the film coating is disposed between the first and second component surfaces; and
irradiating a microwave energy field to the film coating to generate thermal energy on the film coating to bond together the first and second optical components.

17. The method as defined in claim 16, wherein the film coating is positioned within a distance of 500 microns from the adjoining interface.

18. The method as defined in claim 16, wherein the film coating has a thickness in the range of 10 to 110 nanometers.

19. The method as defined in claim 18, wherein the film coating has a thickness in the range of approximately 25 to 75 nanometers.

20. The method as defined in claim 16, wherein the film coating is optically transparent with an optical density in the range of 0.1 to 0.9.

21. The method as defined in claim 16, wherein the microwave energy field has a frequency in the range of about 300 megahertz to 100 gigahertz.

22. The method as defined in claim 16, wherein the microwave energy field is transmitted at a power in the range of about 50 watts to 1000 watts.

23. The method as defined in claim 16, wherein the film coating comprises a ferro nickel based metal alloy.

24. The method as defined in claim 16 further comprising the step of applying an adhesive material between the first and second component surfaces, wherein the thermal energy generated in the film coating cures the adhesive material.

25. The method as defined in claim 16 further comprising the step of applying a solder material between the first and second component surfaces, wherein the thermal energy generated in the film coating forms a solder joint.

26. The method as defined in claim 25, wherein the solder material is a soldering alloy.

27. The method as defined in claim 26, wherein two different solder materials are deposited on the adjoining interface to form a low temperature eutectic soldering alloy.

28. The method as defined in claim 16, wherein the thermal energy generated in the film coating forms a weld at the adjoining interface of the first and second component surfaces.

29. A joint interconnecting first and second components, said joint comprising:
a first component having a first component surface;
a second component having a second component surface; and
a film coating of electrically conductive material disposed at an adjoining interface between the first and second component surfaces of the first and second components, wherein the film coating has a thickness of less than 200 nanometers, and wherein the joint is formed by irradiating a microwave energy field to the film coating such that the film coating generates thermal energy to bond together the first and second component surfaces to form the joint.

30. The joint as defined in claim 29, wherein the film coating has a thickness in the range of 10 to 110 nanometers.

31. The joint as defined in claim 30, wherein the film coating has a thickness in the range of approximately 30 to 100 nanometers.

32. The joint as defined in claim 29, wherein the film coating comprises a ferro nickel based metal alloy.

33. The joint as defined in claim 29, wherein the first and second components comprise optical components.

34. The joint as defined in claim 29, wherein the first and second components are substantially transparent to the microwave energy field.

35. The joint as defined in claim 29 further comprising an adhesive material disposed between the first and second component surfaces, wherein the thermal energy generated in the film coating cures the adhesive material.

36. The joint as defined in claim 29 further comprising a solder material disposed between the first and second component surfaces, wherein the thermal energy generated in the film coating forms a solder joint.

37. The method as defined in claim 36, wherein the solder material is a soldering alloy.

38. The method as defined in claim 37, wherein two different solder materials are deposited on the adjoining interface to form a low temperature eutectic soldering alloy.

39. The joint as defined in claim 29, wherein the thermal energy generated in the film coating forms a weld at the interface of the first and second component surfaces.

40. A joint interconnecting first and second optical components, said joint comprising:

a first optical component having a first component surface and being substantially transparent to a microwave energy field;

a second optical component having a second component surface and being substantially transparent to a microwave energy field; and a film coating of electrically conductive material disposed at an adjoining interface between the first and second component surfaces of the first and second optical components, wherein the film coating has a thickness of less than 200 nanometers, and wherein the joint is formed by irradiating a microwave energy field to the film coating such that the film coating generates thermal energy to bond the first and second component surfaces together to form the joint.

* * * * *